June 19, 1928.

G. BOYRON 1,673,791

SUBMARINE SAFETY DEVICE

Filed May 24, 1926   3 Sheets-Sheet 1

INVENTOR
Gaston Boyron
BY
[signature]
ATTORNEY

June 19, 1928.  G. BOYRON  1,673,791
SUBMARINE SAFETY DEVICE
Filed May 24, 1926   3 Sheets-Sheet 2
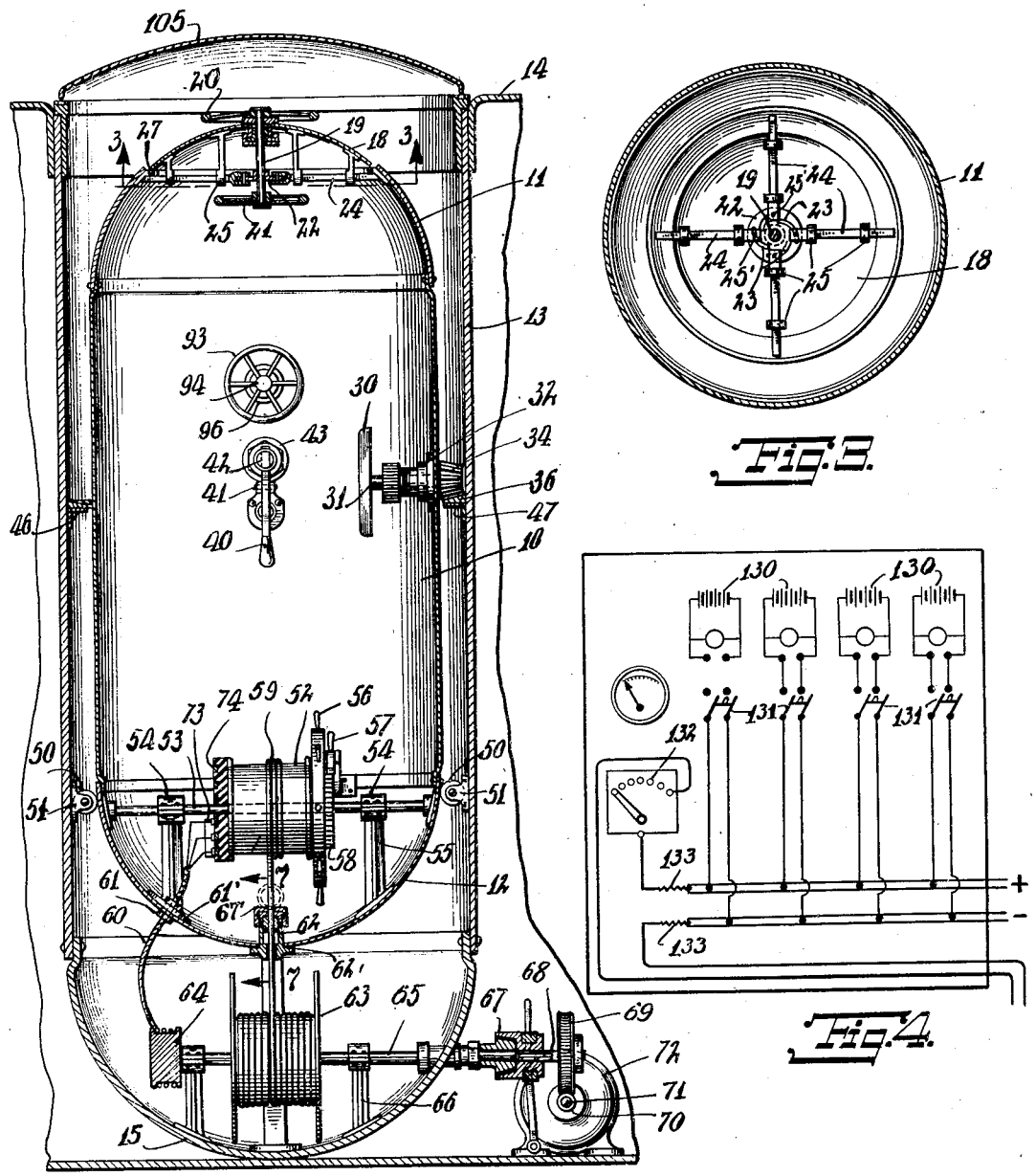
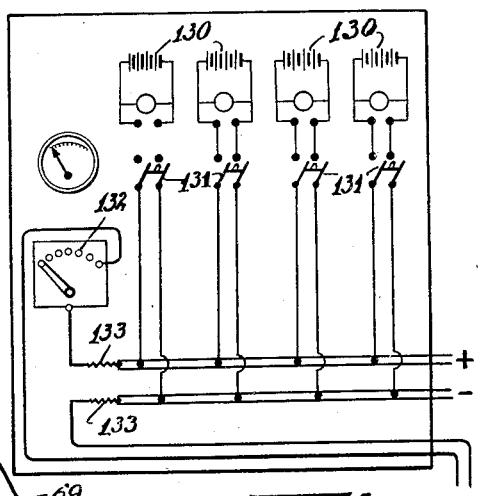
INVENTOR
Gaston Boyron
BY
ATTORNEY June 19, 1928.

G. BOYRON 1,673,791

SUBMARINE SAFETY DEVICE

Filed May 24, 1926

INVENTOR
Gaston Boyron
BY
ATTORNEY

Patented June 19, 1928.

1,673,791

UNITED STATES PATENT OFFICE.

GASTON BOYRON, OF NEW YORK, N. Y.

SUBMARINE SAFETY DEVICE.

Application filed May 24, 1926. Serial No. 111,126.

This invention relates generally to submarine safety devices, the invention having more particular reference to a novel type of submarine safety device adapted to be used in case of accident to the submarine equipped therewith.

The invention has for an object the provision of an improved submarine safety device of novel construction and arrangement of parts.

For further comprehension of the invention, and of the objects and advantages thereof, reference will be had to the following description and accompanying drawings, and to the appended claims in which the various novel features of the invention are more particularly set forth.

Fig. 2, is a vertical sectional view taken on the line 2—2 of Fig. 1.

Fig. 3, is a horizontal sectional view taken on the line 3—3 of Fig. 2.

Fig. 4, is a diagrammatic view of the wiring as used in connection with my improved device.

Figure 1:
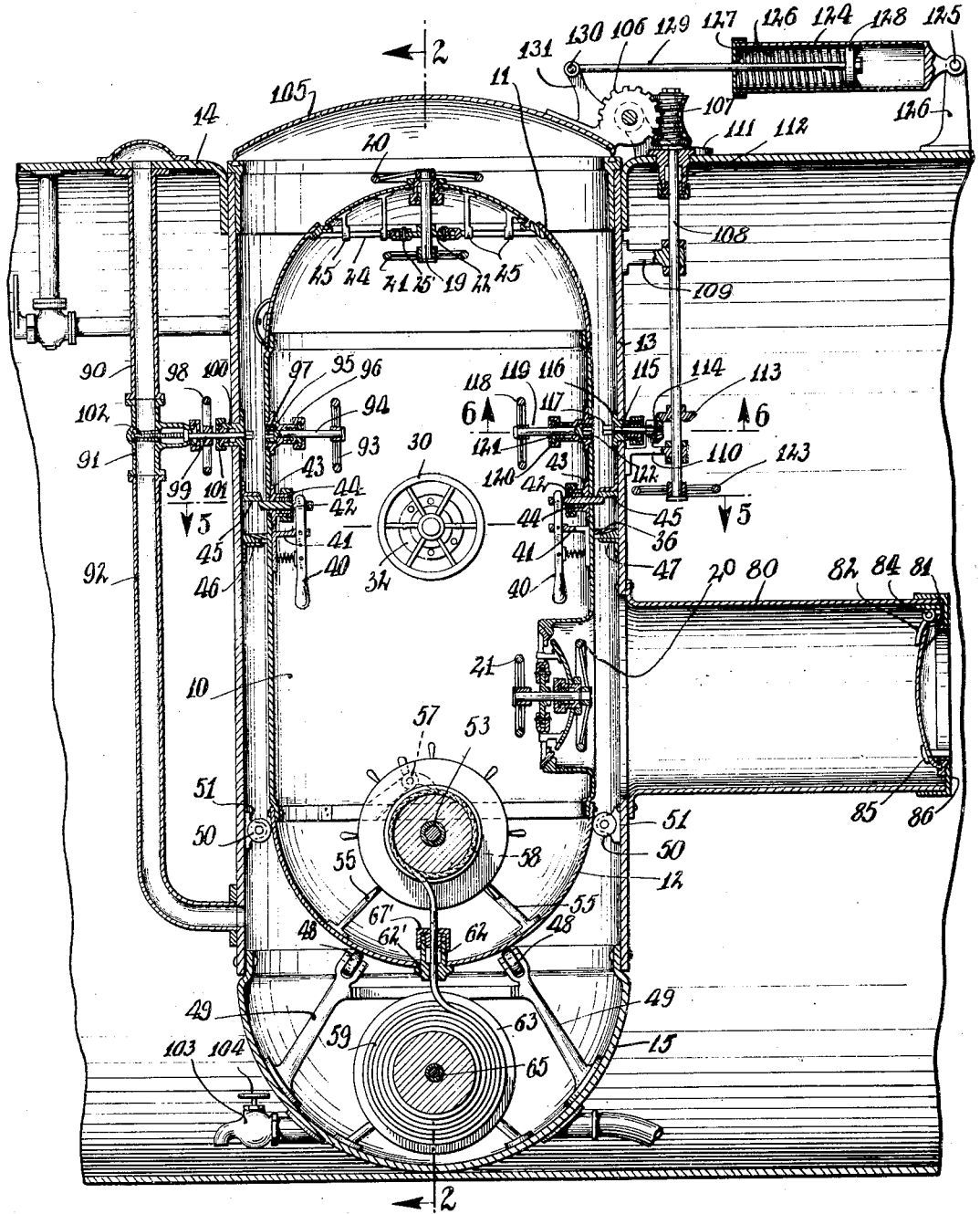
Fig. 1, is a fragmentary sectional view of a submarine illustrating my improved submarine safety device.

As here embodied my improved submarine safety device comprises briefly a float 10, of hollow cylindrical construction, and provided with an upper end 11 and a lower end 12, preferably semi-spherical shaped, suitably attached thereto. The float 10 is normally positioned in a hollow cylindrical member 13, suitably built into a submarine, and extending downward from the deck 14 of the said submarine, and is provided with a lower end 15, preferably semi-spherical shaped, suitably attached thereto.

The upper end 11 of the said float has removably attached thereto a cap 18, adapted to rotatively support a shaft 19 having hand wheels 20 and 21 attached thereto, at its upper and lower extremities, respectively. The face cam 22 is attached to the shaft 19, and is provided with cam apertures 23, to which the arms 24 are operatively attached by means of pins 25' adapted to engage the cam apertures 23. The arms 24 are slidably positioned in suitable supports 25, attached to and depending from the cap 18. The above described construction is such as will permit the hand wheels 20 or 21 when rotated or turned to engage or disengage the arms 24 with the flange 27 of the above mentioned upper end 11 of the said float, so as to rigidly attach the said cap 18 thereto, or to permit the cap 18 to be removed therefrom. The hand wheels 20 and 21 are positioned outside and inside the said float, so as to permit the above described operation to be carried out by persons inside or outside the said float.

The hand wheel 30 is attached to the shaft 31 rotatively and slidably mounted in the supporting member 32 attached to the float 10, and provided with a suitable stuffing box 33. The pinion 34 is attached to the shaft 31. The ring member 35 is attached to the hollow cylindrical member 13, and is provided with gear teeth 36 and a blank space 37 suitably located between the gear teeth 36. The above described construction is such as will permit the hand wheel when pushed or forced outward, when the float 10 is positioned as shown in Figs. 1 and 2 of the accompanying drawing, to engage the pinion 34 with the gear teeth 36 so as to rotate or turn the float 10 until the pinion 34 reaches the blank space 37.

The lever 40 is pivotally attached to the support 41 suitably attached to the float 10, and having pivotally attached thereto engaging members 42, slidably located in suitable members 43 attached to the float 10 and provided with suitable stuffing boxes 44.

The above described construction is such as will permit the engaging members 42 to be engaged with or disengaged from the locking members 45 comprising annular flange members attached to the hollow cylindrical member 13, when the lever 40 is forced outward or pressed inward, so as to hold the float 10 in the position as clearly shown in Figs. 1 and 2, and so as to permit the float 10 to be removed therefrom, it being understood that the locking members 45 are so positioned as to permit the engaging members 42 to be engaged therewith, when the float 10 is positioned, as above described, by the hand wheel 30 that is when pinion 24 engages space 37.

The depending members 46 and 47, are attached to the hollow cylindrical member 13 to support the ring member 35, so as to position the said float 10 in the hollow cylindrical member 13, as clearly shown in Figs. 1 and 2 of the accompanying drawings. The rollers 48 are rotatively mounted in the supports 49, suitably attached to the lower end 15 of the hollow cylindrical member 13, and extending upward therefrom, so as to permit the said float 10 to be rotated as hereinbefore set forth and described. The rollers 50 are rotatively mounted in the brackets 51 suitably attached to the hollow cylindrical member 13, so as to permit the float 10 to be removed from the hollow cylindrical member 13, as will be hereinafter more fully described.

The drum 52 is rotatively mounted on the shaft 53 supported in suitable bearings 54 attached to supports 55 suitably attached to the lower end 12 of the float 10. The hand wheel 56 is attached to the drum 52. The pawl 57 is pivotally attached to the hand wheel 56, and is adapted to be engaged with a ratchet wheel 58 attached to the said shaft 53, so as to hold the said drum 52 in any relative position on the shaft 53. The flexible member 59, cable or the like, is attached at one extremity to the drum 52 and extends downward therefrom and through a suitably flanged member 62, through the lower end 12 of the float 10, and is attached at its lower extremity to the drum 63.

The flanged member 62 is attached as at 62', by bolts, studs, screws or the like to the lower end of the float 10, and is provided with an axial aperture 63' adapted to hold packing 64' preferably in wedge shaped strips, and packing 65' preferably in round shaped strips, the said packing 64' and 65' is alternatively positioned in the said aperture 63'. The stuffing box gland 66' is slidably mounted in the aperture 63', and is forced or slid downward by the cap 67' threadedly attached, as at 68' to the flanged member 62. The above described construction is such as will prevent leakage of water into the float 10.

The said flexible member 59 is of suitable length to permit the float 10 to be raised, as hereinafter described, any desired distance from the hollow cylindrical member 13. The drum 63 is attached to a shaft 65 rotatively mounted in supports 66 suitably attached to the lower end 15 of the hollow cylindrical member 13, and has operatively attached thereto a clutch 67 adapted to engage or disengage the shaft 68, to which is attached a worm wheel 69 meshing with a worm 70 attached to the shaft 71 of the electric motor 72 suitably attached to any convenient part of the said submarine and operatively connected to a battery or any suitable convenient source of electric power. The above described construction is such as will permit the hand wheel 56 or the electric motor 72 by means of the flexible member 59 to return or pull the said float 10 to the position as clearly shown in Figs. 1 and 2 of the accompanying drawings.

The electric cable 60 is attached as at 73, to insulated rings 74 suitably mounted on the drum 52, so as to make a constant contact when the said drum 52 is rotated, and is operatively attached to a signal transmitting instrument, not shown in the accompanying drawings, such as generally employed to send or transmit messages, signals or the like. The electric cable 60 extends through an aperture 61 located in the bracket 61' attached to the lower end 12 of the float 10, and is attached to the drum 64, attached to the above mentioned shaft 65. The above described construction is such as will permit the electric cable 60 to be extended as required when the said float 10 leaves the submarine.

The entrance chamber 80, preferably hollow cylindrical shaped, is attached at one extremity, to the hollow cylindrical member 13, and extends horizontally therefrom, and is provided with an end plate 81, removably attached thereto, by any suitable arrangement, such as a lever 82, pivotally attached to chamber 80, as at 84, and is held in a closed position by a handle 85, adapted to engage the edge of a flanged element 86 of the said float. Handwheels 20 and 21 operating similar mechanism as described for opening cap 18 are provided adjacent to or in line with the entrance chamber 80 and one is positioned in the side entrance of the float 10. The above described construction is such as will permit people to enter or leave the float 10, when the float 10 is positioned in the hollow cylindrical member 13 as clearly shown in Figs. 1 and 2.

The pipe 90 is intercommunicative with the deck 14 of the submarine and with the valve 91. The pipe 92 is intercommunicative with the valve 91 and the cylindrical hollow member 13. The hand wheel 93 is attached to the shaft 94, rotatively and slidably mounted in the supporting member 95 attached to the float 10, and provided with a suitable stuffing box 96. The engaging member 97 is attached to the shaft 94. The hand wheel 98 is attached to the shaft 99 rotatively mounted in the supporting member 100 attached to the hollow cylindrical member 13, and provided with a suitable stuffing box 101. The shaft 99 is suitably attached to a valve member 102 slidably located in the said valve 91. The above described construction is such as will permit the hand wheels 93 and 98 to close or open the valve member 102, so as to allow water to enter the hollow cylindrical member 13, so as to raise the float 10.

The faucet 103 provided with a valve 104 is attached to the lower end 15 of the hollow cylindrical member 13, so as to permit the water in the said hollow cylindrical member 13 to be drawn or taken therefrom.

The cap 105, adapted to enclose or encase the upper end of the hollow cylindrical member 13, has attached thereto a worm gear 106 engaging with a worm wheel 107 attached to the shaft 108 rotatively supported in suitable brackets 109 and 110. The bracket 111 attached to the deck 14 of the submarine, is provided with a suitable stuffing box 112. The pinion 113 is attached to the shaft 108 and meshes with a pinion 114 attached to the shaft 115 rotatively supported in a support 116 attached to the hollow cylindrical member 13, and is provided with an engaging member 117. The hand wheel 118 is attached to the shaft 119 rotatively and slidably mounted in the supporting member 120 attached to the float 10 and provided with a suitable stuffing box 121.

The shaft 119 is provided with an engagement member 122. The hand wheel 123 is attached to the above mentioned shaft 108. The above described construction is such as will permit the hand wheels 118 and 123 to open or close the cap 105.

The cylinder 124 is pivotally attached as at 125 to a support 126 attached to the deck 14 of the submarine, and is adapted to contain or hold a compression spring 126, located therein and superimposed between a cap 127 removably attached to the said cylinder 124 and a plunger 128 slidably mounted in the cylinder 124. The shaft 129 is attached at one extremity to the plunger 128 and extends through an aperture in the cap 127 and is pivotally attached, as at 130 to a bracket 131 attached to the above mentioned cap 105. The above described construction is such as will permit the compression spring 126 to assist in opening the said cap 105, against the pressure of the water when the submarine is submerged.

Figure 5:
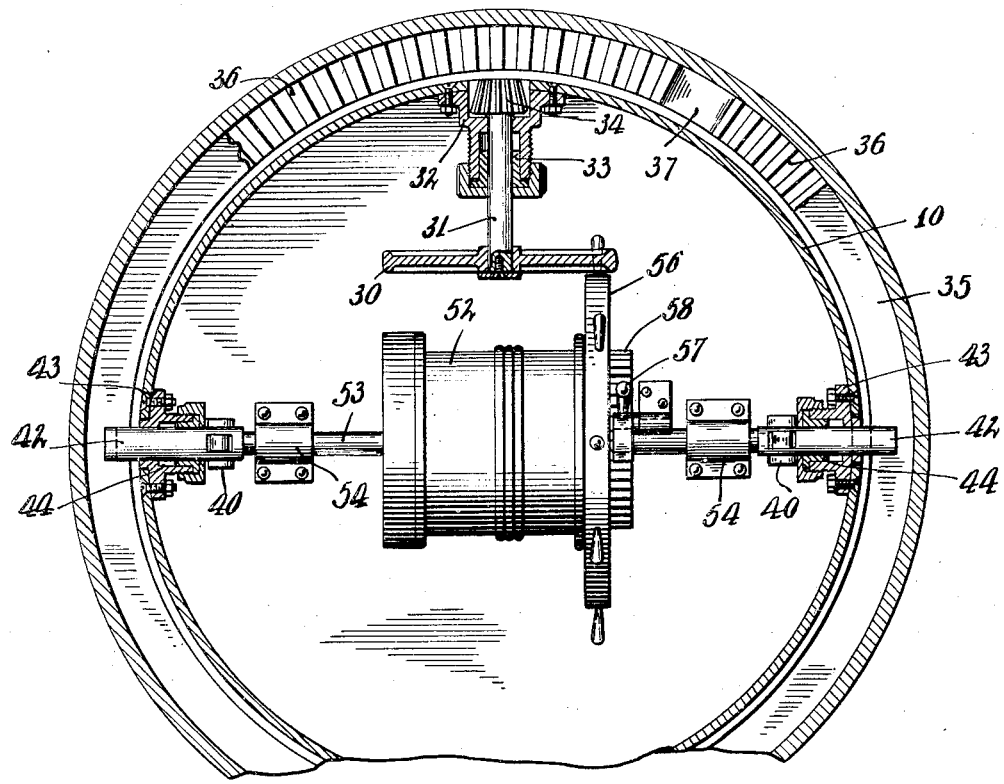
Fig. 5, is an enlarged fragmentary horizontal sectional view taken on the line 5—5 of Fig. 1.
Figure 6:
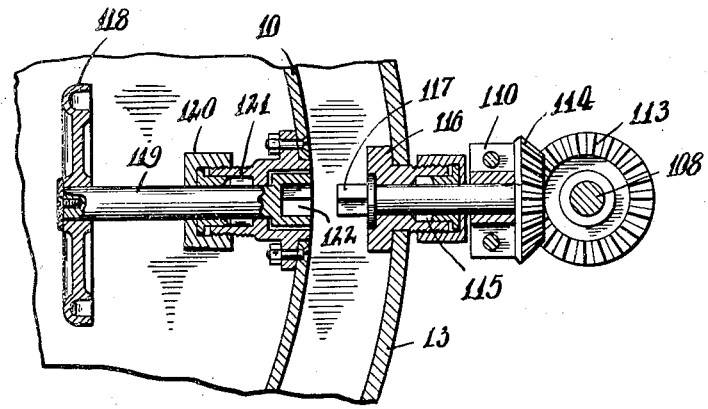
Fig. 6, is a similar view taken on the line 6—6 of Fig. 1.
Figure 7:
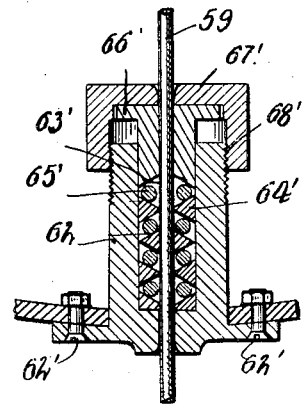
Fig. 7, is an enlarged fragmentary vertical sectional view taken on the line 7—7 of Fig. 2.

Referring in particular to Fig. 4, of the accompanying drawing, the batteries 130 are connected to switches 131 and to the rheostat 132, and are provided with suitable fuses 133 and are connected to the above mentioned electric motor 72, not shown. The above described construction is such as will permit the batteries 130 to operate or rotate the electric motor 72, at any desired speed, for the purpose as hereinbefore set forth and described. It should be understood that rotation of the float 10 relative to the casing is employed for effecting registration of the entrance thereof with the entrance chamber 80 and registration of the shafts 94 and 119 of the float with shafts 99 and 115 respectively, of the casing. When the pinion 34 is in registration with the blank space 37 of the flange 36, then the above mentioned elements are in registration with each other and further rotation of the float 10 is unnecessary but when the pinion 34 is not in registration with the blank space 37 the rotation of the float is essential for placing the same in the above described position. The locking members 45 comprise annular flanges which extend completely around the inner surface of the casing for retaining the float therein when the handles 40 are in the position illustrated in Fig. 5.

It will be understood that the float 10 is of suitable size and dimensions to accommodate a number of people, and that the said float 10 is provided with the necessary packings or the like so as to make the float 10 watertight.

Having thus described my invention, what I claim as new and desire to protect by Letters Patent of the United States is as follows:

1. In a submarine device of the class described, a hollow cylindrical casing extending downwardly into the body of a submarine from the deck thereof, a float comprising a hollow cylindrcal member adapted to be disposed in said casing, spaced rollers mounted on the inner surface of said casing adapted to engage the outer surface of said float, a bearing member comprising a stuffing box mounted in said float on the wall thereof, a shaft slidably and rotatively journaled in said bearing and extending through an aperture in the wall of said float, a pinion on the outer end of said shaft, a hand wheel on the inner end of said shaft, a circumferential flange disposed around the inner surface of said casing, and gear teeth on said flange adapted to mesh with the teeth of said pinion when said shaft is extended outwardly from said float for rotating said float for bringing the latter into a predetermined position relative to said casing, there being a blank space between the teeth of said circumferential flange for receiving said pinion to prevent further rotation of said float when the latter reaches a predetermined position.

2. In a submarine device of the class described, a hollow cylindrical casing extending downwardly into the body of a submarine from the deck thereof, a float comprising a tubular member disposed in said casing, supporting members mounted in the bottom end of said float, a shaft mounted in said supporting members, a drum rotatively mounted on said shaft, a packing box mounted on the bottom wall of said float in registration with an aperture in said wall, a cable disposed through said packing box and said aperture and attached at one end to said drum, a hand wheel attached to said drum for rotating the same, a pawl pivotally mounted on said hand wheel, a ratchet wheel attached to said shaft adapted to be engaged by said pawl for retaining said drum in a predetermined position, a shaft rotatively mounted in the bottom of said cylindrical casing, a drum rigidly attached to said shaft, the lower end of said cable being attached to said last mentioned drum, and driving mechanism operatively connected with last mentioned shaft for mechanically rotating said last mentioned drum, said cable being adapted to be wound on either of said drums for drawing said float into said cylindrical casing.

3. In a submarine device of the class described, a hollow cylindrical casing extending downwardly into the body of a submarine from the deck thereof, a float comprising a hollow cylindrical member adapted to be disposed in said casing, a circumferential flange disposed around the inner surface of said casing, gear teeth on said flange, there being a blank space in the series of gear teeth thereof, and means comprising a shaft slidably mounted in an aperture in said float and a pinion thereon engageable with the gear teeth of said flange for rotating said float relative to said casing until said pinion becomes in registration with said blank space for placing said float in a predetermined position relative to said casing.

4. In a submarine device of the class described, a hollow cylindrical casing extending downwardly into the body of a submarine from the deck thereof, a float comprising a hollow cylindrical member adapted to be disposed in said casing, a circumferential flange disposed around the inner surface of said casing, gear teeth on said flange, there being a blank space in the series of gear teeth thereof, means comprising a shaft slidably mounted in an aperture in said float and a pinion thereon engageable with the gear teeth of said flange for rotating said float relative to said casing until said pinion becomes in registration with said blank space for placing said float in a predetermined position relative to said casing, a second arcuate flange mounted on the inner side of said casing, and locking mechanism comprising a rod adapted to be extended below said second mentioned flange for releasably holding said float in said casing.

5. In a submarine device of the class described, a hollow cylindrical casing extending downwardly into the body of a submarine from the deck thereof, a float comprising a hollow cylindrical member adapted to be disposed in said casing, a drum rotatively mounted in the bottom portion of said float, a drum rotatively mounted in the bottom portion of said casing, a cable disposed around said drums at its end portions and attached thereto at its extremities, said cable being adapted to be wound on either of said drums for drawing said float into said casing, mechanical driving mechanism mounted in said submarine and operatively connected with said last mentioned drum for rotating the same, and manual operating mechanism associated with said first mentioned drum for driving the same.

In testimony whereof I have affixed my signature.

GASTON BOYRON.